United States Patent
Masaki

Patent Number: 5,940,571
Date of Patent: Aug. 17, 1999

[54] NONDIFFUSIVE LIGHT GUIDE PLATE, LENS FILM AND SURFACE LIGHT SOURCE ASSEMBLY

[75] Inventor: Tadahiro Masaki, Shinjuku-Ku, Japan

[73] Assignee: Dai Nippon Printing Co., Ltd., Japan

[21] Appl. No.: 08/919,773

[22] Filed: Aug. 29, 1997

[30] Foreign Application Priority Data

Sep. 2, 1996 [JP] Japan .................................. 8-248467

[51] Int. Cl.$^6$ ...................................................... G02B 6/10
[52] U.S. Cl. .............................. 385/146; 385/33; 385/36; 385/147
[58] Field of Search ................................. 385/33, 31, 36, 385/37, 38, 146, 147, 901

[56] References Cited

U.S. PATENT DOCUMENTS

| | | | |
|---|---|---|---|
| 4,813,765 | 3/1989 | Negishi | 385/146 X |
| 4,824,194 | 4/1989 | Karasawa | 385/146 X |
| 5,237,641 | 8/1993 | Jacobson et al. | 385/146 |
| 5,265,177 | 11/1993 | Cho et al. | 385/14 |
| 5,303,322 | 4/1994 | Winston et al. | 385/146 |

*Primary Examiner*—Brian Healy
*Attorney, Agent, or Firm*—Parkhurst & Wendel, L.L.P.

[57] ABSTRACT

A surface light source is capable of emitting light in a narrow directional luminance distribution, at a low loss in quantity of light and in a uniform surface luminance distribution, and consists of a relatively small number of parts. The surface light source is provided with a nondiffusive light guide plate and a lens film. The surface light source assembly need not be provided with any diffusive film on the outer side of the light exit surface of the light guide plate, because the light guide plate is not provided with any diffusive reflecting layer of printed dots on the back surface thereof. The back surface is a concavely curved surface extended opposite to the light exit surface, having a section in a plane perpendicular to both the side light entrance surface and the nondiffusive light exit surface, delineated by a concave curve, such as an approximate parabolic curve, and curved so that the space between the light exit surface and the back surface, and the gradient thereof decrease with distance measured in the direction of travel of received light rays from the side light entrance surface. The lens film has a light entrance surface provided with a plurality of triangular prisms in a two-dimensional arrangement. The vertical angle of the triangular prisms is determined so that light rays leaving the light exit surface of the light guide plate in a direction oblique to and deviating from a normal to the light exit surface can be refracted so as to leave the light exit surface of the lens film in a direction parallel to a normal to the light exit surface of the lens film.

18 Claims, 6 Drawing Sheets

NONDIFFUSIVE LIGHT GUIDE PLATE, LENS FILM AND SURFACE LIGHT SOURCE ASSEMBLY

BACKGROUND OF THE INVENTION

The present invention relates to an edge type surface light source to be used as a backlight for a transmission liquid crystal display, an advertising board or the like, and a light guide plate and a lens film to be used as the component parts of the surface light source. More particularly, the present invention relates to a surface light source capable of emitting light in a narrow directional luminance distribution, at a low loss in quantity of light and in a uniform surface luminance distribution, and consisting of a relatively small number of parts, and to a light guide plate and a lens film suitable for use as the components of the surface light source assembly.

Backlights for transmission displays, such as liquid crystal displays, are classified by the position of their light sources into side backlights provided with a light source beside a side edge thereof, and direct backlights provided with a light source behind them. Most liquid crystal displays employ a side backlight, because a liquid crystal display provided with a side backlight needs a small space and can be formed in a small thickness.

Figure 10:
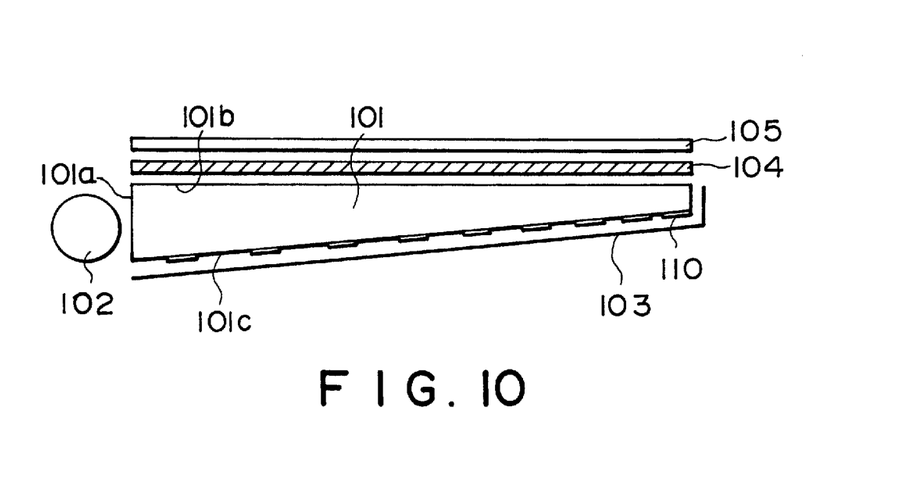
FIG. 10 is a schematic sectional view of a conventional edge surface light source assembly.

Referring to FIG. 10 showing a conventional side surface light source assembly by way of example in a sectional view, a light guide plate 101 receives light through a side surface thereof serving as a light entrance surface 101a, and emits light through a two-dimensional light exit surface 101b. A back surface 101c lies opposite to the light exit surface 101b. The back surface 101c is inclined to the light exit surface 101b so that the thickness of the surface light source assembly decreases linearly with distance from the light entrance surface 101a. A linear light source 102 is disposed near and in parallel to the light entrance surface 101a. A reflector 103, such as a light reflecting film or the like, is disposed near and below the back surface 101c. A light diffusing film 104 is disposed near and over the light exit surface 101b, and a lens film 105 is disposed near and over the light diffusing film 104.

As shown in FIG. 10, this light guide plate 101 is formed by forming a diffusive reflecting layer 110 on the back surface of a plate of a predetermined shape produced by injection molding or by cutting a plate of a predetermined shape out of a transparent resin block, such as an acrylic resin block, and polishing the surfaces of the plate.

The linear light source 102 is a cold-cathode tube. The reflector 103 is a resin film coated with a metal thin film deposited by evaporation. The light diffusing film 104 is an opal resin film. The lens film 105 is a resin film provided with a plurality of triangular prisms. The diffusive reflecting layer 110 is a layer of numerous minute white dots formed on the back surface of the light guide plate 101 by printing. The density of the minute white dots is increased with distance from the light entrance surface 101a near the light source 102 to compensate the reduction of the quantity of light with distance from the light entrance surface 101a so that the light guide plate 101 has a uniform surface luminance distribution. The light diffusing film 104 diffuses the light leaving the light exit surface 101b of the light guide plate 101 so that the white dots forming the diffusive reflecting layer 110 and the light source 102 are not directly visible from the side of the light exit surface 101b.

This conventional side surface light source assembly has the following drawbacks. When forming the diffusive reflecting layer 110 by forming the minute white dots by a screen printing process on the back surface of the light guide plate 101, the dots are not formed in a desired shape and a desired area if the meshes of a printing screen are clogged with the ink, which reduces the yield of a guide plate forming process. The light diffusing film 104, i.e., an additional part, is necessary to make the printed dots invisible. Since the surface light source assembly needs the printed dots and the light diffusing film 104, the surface light source assembly manufacturing process needs additional work for printing the dots and combining the light diffusing film 104 with the light guide plate 101, which unavoidably increases the manufacturing cost of the side surface light source assembly.

A surface light source assembly employed in some display is required only to emit light in a narrow directional luminance distribution around a specific direction, such as a direction normal to its light exit surface. If the conventional surface light source assembly is employed in such a display required to be sufficiently bright in a narrow angle of view, light is diffused in an excessively wide range and light is used inefficiently.

SUMMARY OF THE INVENTION

Accordingly, it is an object of the present invention to solve the foregoing problems in the prior art, and to provide a surface light source assembly capable of emitting light in a narrow directional luminance distribution at a low loss in quantity of light and in a uniform surface luminance distribution, and consisting of a relatively small number of parts, and to provide a light guide plate and a lens film suitable for use as the components of the surface light source assembly.

Any light diffusing plate need not be disposed on the front side of a light guide plate when any printed dots are not formed on the back surface of the light guide plate. However, if any printed dots are not formed on the back surface of the light guide plate, there arise a problem (1) that the uniformity of surface luminance distribution is deteriorated and a problem (2) that the direction of travel of most part of the light leaving the light guide plate travels in directions deviating from a direction normal to the light exit surface of the light guide plate and most part of the light travels obliquely to the light exit surface of the light guide plate. The problems (1) and (2) were solved by the following means.

The problem (1) was solved by employing a light guide plate having a light exit surface, and a back surface extended opposite to the light exit surface, delineated by a concave curve, such as an approximate parabolic curve, and curved so that the thickness, i.e., the distance between the light exit surface and the back surface, and the gradient of back surface of the light guide plate decrease with distance measured in the direction of travel of received light from a side light entrance surface.

The problem (2) was solved by employing, in combination with a light guide plate, a lens film capable of deflecting part of light leaving the light exit surface of the light guide plate so that the light leaves its light exit surface in a direction normal to its light exit surface. This lens film is provided with a plurality of triangular prisms formed on its light entrance surface and having a specific vertical angle as a function of a predetermined exit angle Y, i.e., the angle of a direction in which light leaving the lens film travels to a normal to the light exit surface of the lens film, a predetermined entrance angle X, i.e., the angle of a direction in which incident light travels to the light entrance surface of the lens film, and the refractive index n of the lens film; that is, the vertical angle of the triangular prisms is defined by: $0.5[\sin^{-1}\{(\sin Y)/n\}+90+X]$, and, if the vertical angle of the cross section of the triangular prism is divided by a normal to the light exit surface of the lens film into a front-side angle, i.e., an angle between a side of the cross section of the triangular prism on which light falls and the normal, and a back-side angle, i.e., an angle between another side of the cross section of the triangular prism and the normal, the front-side angle is equal to X, and the back-side angle is equal to $0.5[\sin^{-1}\{(\sin Y)/n\}+90-X]$.

When designing the film lens, the predetermined entrance angle X dependent on the properties of the light guide plate, and the positional relation between the light guide plate and the film lens is determined, a desired exit angle Y is determined, the vertical angle of the triangular prisms is determined by calculation taking the refractive index n of the lens film into consideration, and the triangular prisms having the vertical angle thus determined is arranged on the light entrance surface of the lens film.

The surface light source assembly provided with the light guide plate and the lens film thus designed has a smaller number of component parts (omission of the light diffusing film) than the conventional surface light source assembly, and can be fabricated by a reduced number of processes (omission of a process for printing the dots and work for incorporating the light diffusing film into the light guide plate).

Although the directional luminance distribution is narrowed by the omission of the light diffusing film and the printed dots on the back surface of the light guide plate, the narrowed directional luminance distribution does not matter when the surface light source assembly is used for purposes requiring a narrow angle of field. Since the light emitted by the surface light source assembly is directed in directions in a narrow angular range, light emitted by the surface light source assembly can be efficiently used and the surface light source assembly is advantageous when applied to uses requiring a relatively narrow angle of field.

More specifically, a nondiffusive light guide plate in accordance with the present invention receives light falling thereon and emits the light two-dimensionally, has a side light entrance surface on which light falls, a flat, nondiffusive light exit surface, and a curved back surface delineated by a concave curve and curving so that the space between the light exit surface and the back surface, and the inclination of the concave curve decrease with distance from the side light entrance surface.

A lens film in accordance with the present invention capable of deflecting incident light so that the light leaves the lens film at an exit angle different from an entrance angle has a light entrance surface provided with a plurality of triangular prisms, and a flat light exit surface opposite the light entrance surface, in which each triangular prism has a vertical angle expressed by: $0.5[\sin^{-1}\{(\sin Y)/n\}+90+X]$ where Y is a predetermined exit angle, i.e., the angle of a direction in which light leaving the lens film travels to a normal to the light exit surface of the lens film, X is a predetermined entrance angle, i.e., the angle of a direction in which incident light travels to the light entrance surface of the lens film, and n is the refractive index of the lens film, and the vertical angle of the cross section of the triangular prism is divided by a normal to the light exit surface of the lens film into a front-side angle, i.e., an angle between a side of the cross section of the triangular prism on which light falls and the normal, of X and a back-side angle, i.e., an angle between another side of the cross section of the triangular prism and the normal to the light exit surface, of $0.5[\sin^{-1}\{(\sin Y)/n\}+90-X]$.

A surface light source assembly in accordance with the present invention comprises a nondiffusive light guide plate which receives light falling thereon and emits the light two-dimensionally, a light source disposed near a side surface of the nondiffusive light guide plate, and a reflecting member disposed near the back surface of the nondiffusive light guide plate opposite the light exit surface, in which the nondiffusive light guide plate has a side light entrance surface on which light falls, a flat, nondiffusive light exit surface, and a curved back surface delineated by a concave curve and curving so that the space between the light exit surface and the back surface, and the gradient of the concave curve decrease with distance from the side light entrance surface, and the lens film is capable of refracting incident light so that the light leaves the lens film at an exit angle different from an entrance angle, and has a light entrance surface provided with a plurality of triangular prisms, and a flat light exit surface opposite the light entrance surface, in which each triangular prism has a vertical angle expressed by: $0.5[\sin^{-1}\{(\sin Y)/n\}+90+X]$ where Y is a predetermined exit angle, i.e., the angle of a direction in which light leaving the lens film travels to a normal to the light exit surface of the lens film, X is a predetermined entrance angle, i.e., the angle of a direction in which incident light travels to the light entrance surface of the lens film, and n is the refractive index of the lens film, and the vertical angle of the cross section of the triangular prism is divided by a normal to the light exit surface of the lens film into a front-side angle, i.e., an angle between a side of the cross section of the triangular prism on which light falls and the normal, of X and a back-side angle, i.e., an angle between another side of the cross section of the triangular prism and the normal to the light exit surface, of $0.5[\sin^{-1}\{(\sin Y)/n\}+90-X]$.

The nondiffusive light guide plate of the present invention is capable of guiding the incident light so that luminance distribution on its light exit surface is uniform. The lens film of the present invention is capable of diffracting the incident light so that the light leaving the lens film travels in directions including the direction of a normal to the light exit surface. The surface light source assembly comprising the nondiffusive light guide plate and the lens film needs neither the light diffusing plate which is disposed on the side of the light exit surface of the conventional light guide plate nor the printed dots which are formed on the back surface of the conventional light guide plate, is capable of emitting light in a narrow directional luminance distribution at a low loss in quantity of light and in a uniform surface luminance distribution, and consists of a relatively small number of parts.

BRIEF DESCRIPTION OF THE DRAWINGS

The above and other objects, features and advantages of the present invention will become more apparent from the following description taken in connection with the accompanying drawings, in which.

DESCRIPTION OF THE PREFERRED EMBODIMENTS

A nondiffusive light guide plate, a lens film and a surface light source assembly, which embody the present invention, will be described hereinafter.

Nondiffusive Light Guide Plate

Figure 9:
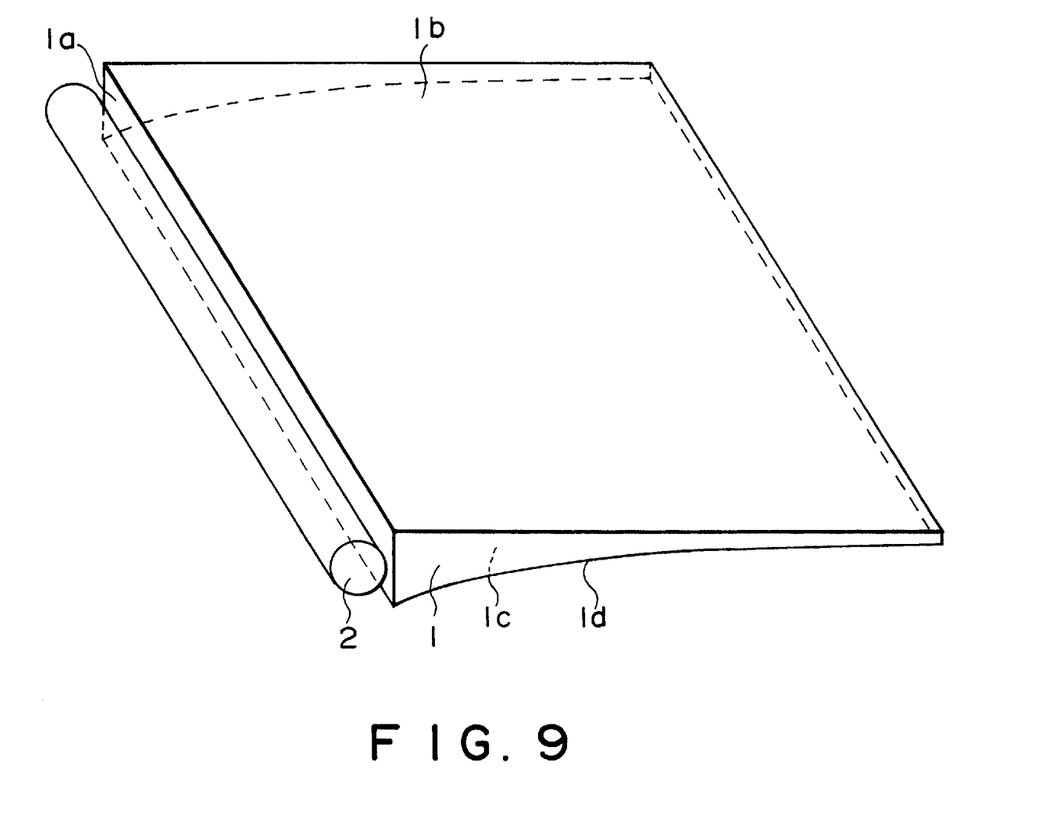
FIG. 9 is a perspective view of assistance in explaining the relation between a light guide plate in accordance with the present invention and a light source.

Referring to FIG. 9 showing a nondiffusive light guide plate 1 in a preferred embodiment according to the present invention in a perspective view, the nondiffusive light guide plate 1 has a side surface serving as a light entrance surface 1a, a flat front surface serving as a light exit surface 1b, and a back surface 1c opposite the light exit surface 1b. The light entrance surface 1a is rectangular, and the light entrance surface 1a and the light exit surface 1b extend perpendicularly to each other. A linear light source 2 is disposed near the light entrance surface 1a. Light emitted by the light source 2 travels through the light entrance surface 1a into the nondiffusive light guide plate 1, travels through the light guide plate 1 and part of the light travels outside through the light exit surface 1b.

Figure 1A:
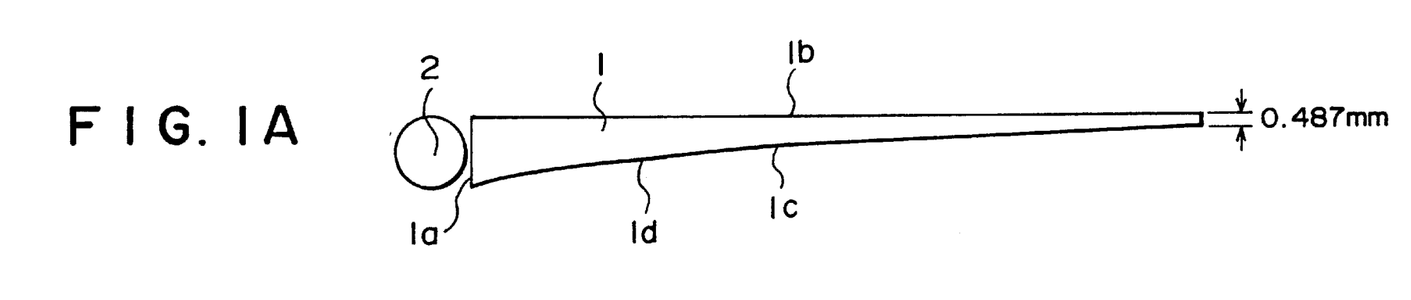
FIG. 1A is a schematic sectional view of a nondiffusive light guide plate in a preferred embodiment according to the present invention.
Figure 1B:
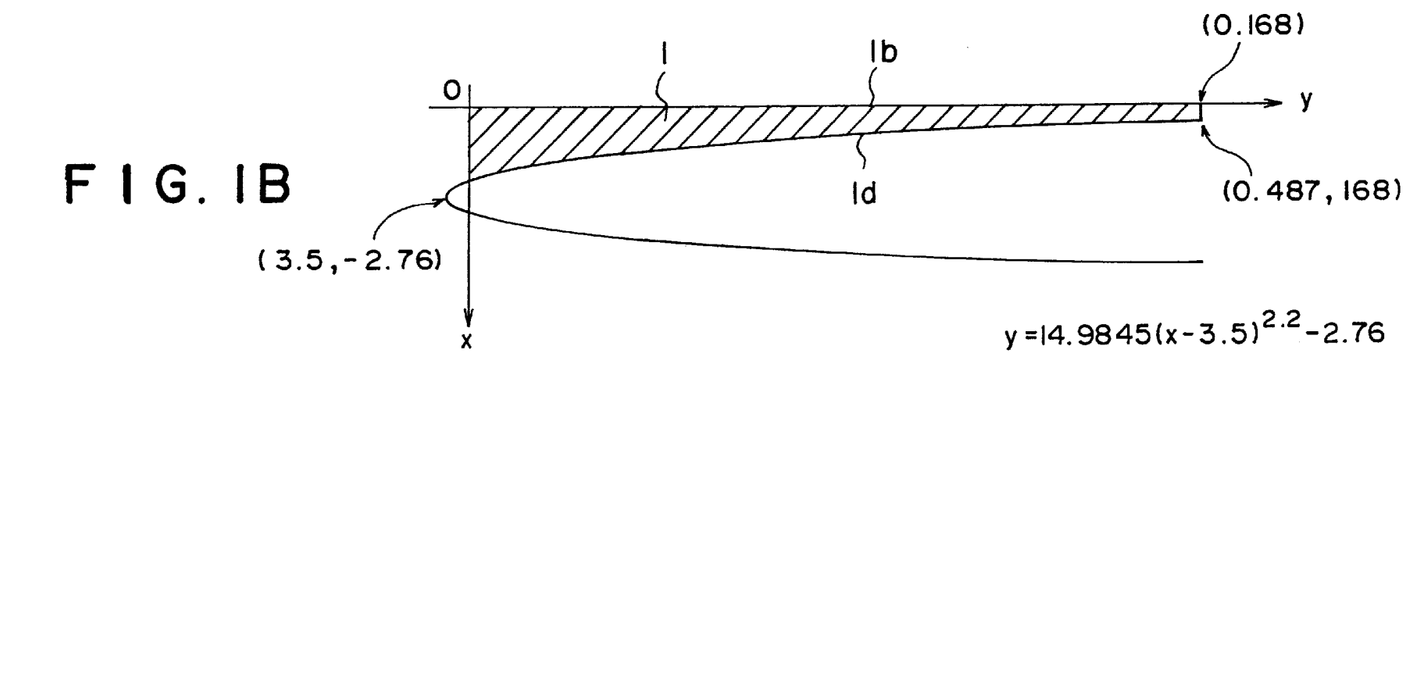
FIG. 1B is a diagrammatic view of assistance in explaining a parabolic curve delineating the concavely curved back surface of the nondiffusive light guide plate of FIG. 1A.

FIG. 1A shows the light guide plate 1 in a sectional view taken on a line parallel to the direction of travel of light rays in the light guide plate, i.e., a direction away from the light source 2. As is obvious from FIG. 1A or 9, the back surface 1c is a curved surface delineated by a concave curve 1d and curved so that the thickness of the light guide plate 1 and the gradient of the back surface 1c decreases with distance from the light entrance surface 1a. The curved side corresponding to the back surface 1c of any section of the light guide plate 1 perpendicular to the light entrance surface 1a coincides with the concave curve 1d. As shown in FIG. 1B, the concave curve 1d delineating the concavely curved back surface 1c of the light guide plate of FIG. 1A is a part of an approximate parabolic curve opening to the right as viewed in FIG. 1B.

The nondiffusive light guide plate 1 is a transparent solid body of an acrylic resin or the like. and the light entrance surface 1a, the light exit surface 1b, the back surface 1c and the material forming the nondiffusive light guide plate 1 are not provided with any diffusive elements.

The conventional light guide plate is a diffusive light guide plate made of a nondiffusive, transparent material and provided with a light diffusing layer of printed dots on its back surface. Another conventional diffusive light guide plate has a satin-finished light exit surface capable of diffusing light. The conventional light guide plate are provided with a light diffusing function by a pseudo secondary light source, such as, the printed dots, to deflect most part of light rays emitted by the light source disposed near the side light entrance surface and received through the side light entrance surface perpendicularly so that most part of received light rays may travel outside through the light exit surface, and the light exit surface is satin-finished to make the printed dots invisible.

Although the nondiffusive light guide plate 1 of the present invention does not diffuse light, a surface light source assembly having excellent performance characteristics can be constructed by using the nondiffusive light guide plate 1 if the nondiffusive light guide plate 1 is formed in an optimum shape or the same is used in combination with an optimum lens film.

The nondiffusive light guide plate is formed in a shape having a generally wedge-shaped cross section of varying thickness gradually decreasing with distance from the light source 2 to prevent the reduction of the amount of light leaving the light exit surface 1b with distance from the light source 2 so that the surface luminance distribution on the light exit surface 1b is uniform. If the thickness of the generally wedge-shaped cross section decreases more sharply with distance from the thicker end toward the thinner end thereof, a greater quantity of received light falls on the light exit surface 1b at incident angles smaller than the critical angle and hence a greater amount of received light leaves the light exit surface 1b. Only light rays that fall on the boundary between the nondiffusive light guide plate 1 and air at incident angles less than the critical angle are able to travel outside the nondiffusive light guide plate 1. Since most of the received light rays fall on the boundary at incident angles slightly smaller than the critical angle, the light rays leaving the nondiffusive light guide plate 1 travel in substantially equal directions.

Light utilization efficiency can be enhanced by forming the nondiffusive light guide plate 1 so that the thinner side thereof opposite the light entrance side thereof has the least possible thickness. The uniformity of the surface luminance distribution of the nondiffusive light guide plate 1 can be secured whereas the luminance of a portion of the nondiffusive light guide plate near the light source is insufficient, if the section of the nondiffusive light guide plate 1 has the shape of a simple wedge having flat working surfaces. According to the present invention, the back surface 1c is formed in a concavely curved surface having a variable gradient gradually decreasing with distance from the light source 2. The concavely curved back surface 1c delineated by a parabolic curve exercises an excellent effect to make surface luminance distribution uniform. Thus, the nondiffusive light guide plate 1 no provided with any printed dots is able to emit light in a uniform surface luminance distribution.

The nondiffusive light guide plate 1 having the back surface 1c delineated by the concave curve 1d may be made of a satisfactorily transparent resin, such as an acrylic resin, by injection molding or the like.

Surface Light Source Assembly

Figure 2:
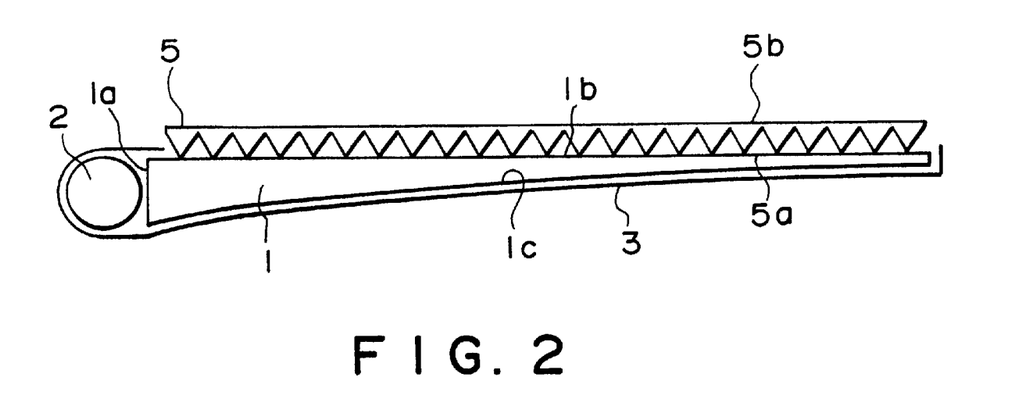
FIG. 2 is a sectional view of a surface light source assembly employing the nondiffusive light guide plate of FIG. 1A.

FIG. 2 shows a surface light source assembly in a preferred embodiment according to the present invention employing the foregoing nondiffusive light guide plate 1 of a specific shape, and a lens film 5 of a specific shape in a preferred embodiment of the present invention, which will be described later.

Referring to FIG. 2, the surface light source assembly comprises the nondiffusive light guide plate 1, a light source 2, such as a linear cold cathode tube, disposed near the light entrance surface 1a of the nondiffusive light guide plate 1, a reflecting member 3, such as a reflecting film, disposed near the back surface 1c of the nondiffusive light guide plate 1, and a lens film 5 disposed near the light exit surface 1b of the nondiffusive light guide plate 1. As shown in FIG. 2, the reflecting member 3 surrounds the light source 2 to reflect light emitted by the light source 2 effectively toward the light entrance surface 1a of the nondiffusive light guide plate 1. The light source 2 and the reflecting member 3 may be those well known in the art. The light source 2 may be a cold cathode tube. preferably, a linear cold cathode tube, and the reflecting member 3 may be a white foam film or a film coated with a metal film, such as an aluminum film, deposited by evaporation.

The lens film 5 shown in FIG. 2 is provided with a plurality of triangular prisms in a two-dimensional arrangement. The lens film 5 has a light entrance surface 5a provided with the plurality of triangular prisms in a two-dimensional arrangement, and a flat light exit surface 5b opposite the light entrance surface 5a. The lens film 5 is disposed near the light exit surface 1b of the nondiffusive light guide plate 1 with the light entrance surface 5a thereof facing the light exit surface 1b. The lens film 5 has a specific shape, which will be described below, capable of effectively deflecting light rays traveling at an angle to a normal to the light exit surface 1b and falling on the light entrance surface 5a thereof so that the light rays leaving the surface light source assembly travel in directions substantially parallel to a normal to the light exit surface 5b of the lens film 5.

Lens Film

The lens film 5 in accordance with the present invention deflects incident light rays so that the light rays leaves the lens film 5 at an exit angle different from an entrance angle, and is provided with the plurality of triangular prisms of a specific shape, which will be described below, in a two-dimensional arrangement.

When employed in the surface light source assembly, the lens film 5 is disposed with the light entrance surface 5a provided with the plurality of triangular prisms facing the nondiffusive light guide plate 1. Light rays transmitted through the nondiffusive light guide plate 1 travels at a peak exit angle to the light exit surface of the nondiffusive light guide plate 1. If it is desired to make the light rays transmitted through the nondiffusive light guide plate 1 travel in a direction at an exit angle different from the peak exit angle, lens film 5 deflects the incident light rays so that the light rays leaving the lens film 5 travel in a direction at a desired exit angle to the light exit surface 5a different from the peak exit angle.

Figure 3:
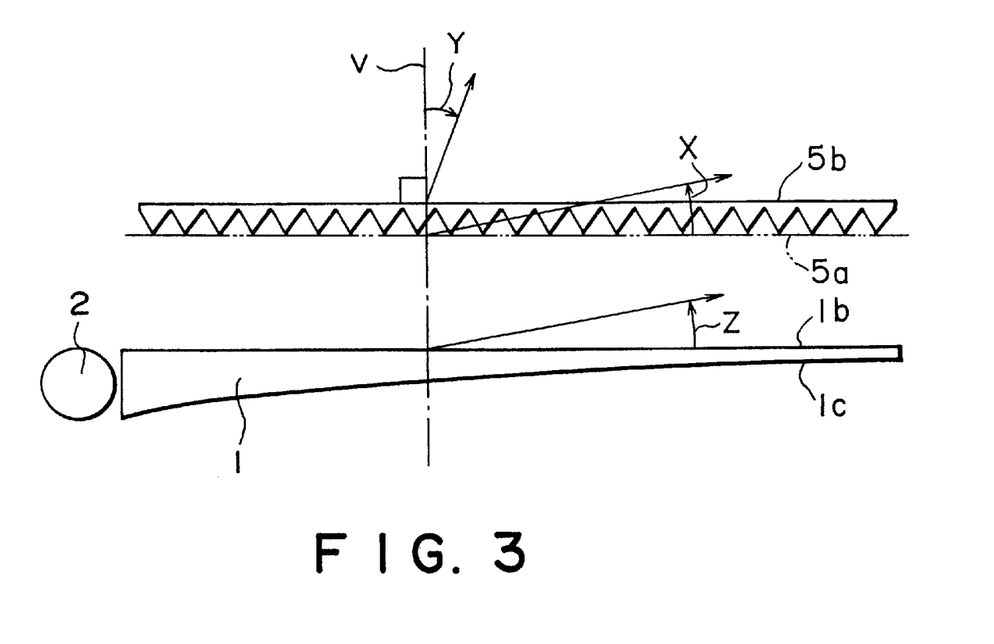
FIG. 3 is a diagrammatic view of assistance in explaining a predetermined entrance angle X, i.e., the angle of a direction in which incident light travels to the light entrance surface of the lens film, a predetermined exit angle Y, i.e., the angle of a direction in which light leaving the lens film travels to a normal to the light exit surface of the lens film, and a peak exit angle Z.

The shape of each of the plurality of triangular prisms of the lens film 5 of the present invention is specified by an exit angle Y of a direction in which light leaving the lens film 5 travels to a normal to the light exit surface 5b, Y is a predetermined exit angle, i.e., the angle of a direction in which light leaving the lens film travels to a normal to the light exit surface of the lens film, a predetermined entrance angle X, i.e., the angle of a direction in which incident light travels to the light entrance surface 5a of the lens film 5, and the refractive index n of the lens film 5. FIG. 3 is a diagrammatic view of assistance in explaining the predetermined entrance angle X and the predetermined exit angle Y.

Suppose that the light exit surface 5b of the lens film 5 is parallel to the light exit surface 1b of the nondiffusive light guide plate 1 as shown in FIG. 3. Then, the peak entrance angle X of light rays falling on the light entrance surface 5a of the lens film 5 to a plane parallel to the lens exit surface 5b is equal to the exit peak angle Z of light rays leaving the light exit surface 1b of the nondiffusive light guide plate 1 to a plane parallel to the light exit surface 1b of the nondiffusive light guide plate 1; that is, the exit peak angle is equal to the entrance peak angle, i.e., an angle to a plane parallel to the light exit surface 1b of the lens film 5 at which most of the light rays falling on the lens film 5 fall on the light entrance surface 5a of the lens film 5.

The light exit surface 1b of the nondiffusive light guide plate 1 and the light exit surface 5b of the lens film 5 are flat surfaces, and the light exit surface 1b of the nondiffusive light guide plate 1 and the light exit surface 5b of the lens film 5 are parallel to the light exit surface of the surface light source assembly, i.e., the light exit surface 5b of the lens film 5 if the lens film 5 is the last component of the surface light source assembly with respect to the traveling direction of light. Therefore, the following description will be made on an assumption that the light exit surface 5b of the lens film 5 is parallel to the light exit surface 1b of the nondiffusive light guide plate 1, and the peak entrance angle X is equal to the peak exit angle Z.

Figure 4:
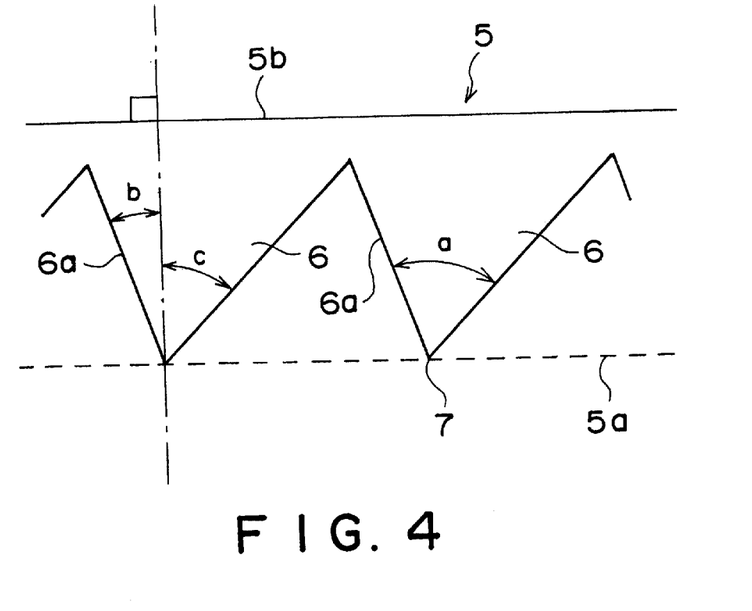
FIG. 4 is a fragmentary sectional view of a lens film in accordance with the present invention.

Referring to FIG. 4 showing an essential portion of the lens film 5 including the triangular prisms 6 forming the light entrance surface 5a in a fragmentary sectional view, the triangular prisms 6 extends perpendicularly to the paper. The light source 2 is on the left side, as viewed in FIG. 4. Usually, the light exit surface 5b of the lens film 5 serves as the light exit surface of the surface light source assembly. The lens film 4 is disposed with the ridges 7 of the triangular prisms 6 facing down as viewed in FIG. 4, i.e., facing the light exit surface 1b of the nondiffusive light guide plate 1, not shown in FIG. 4. The vertical angle a of the triangular prism is divided into a front-side angle b and a back-side angle c by a normal v1 to the light exit surface 5b at the ridge 7 of the triangular prism 6.

The vertical angle a of each triangular prism 6 is $0.5[\sin^{-1}\{(\sin Y)/n\}+90+X]$, the front-side angle b is X, and the back-side angle c is $0.5[\sin^{-1}\{(\sin Y)/n\}+90-X]$. The triangular prisms 6 are shaped so that the front-side angle b is X with an intention to make light rays leaving the light exit surface 1b of the nondiffusive light guide plate 1 at the peak exit angle fall on the front-side surfaces 6a of the triangular prisms 6 perpendicularly to the front-side surfaces 6a.

Figure 5:
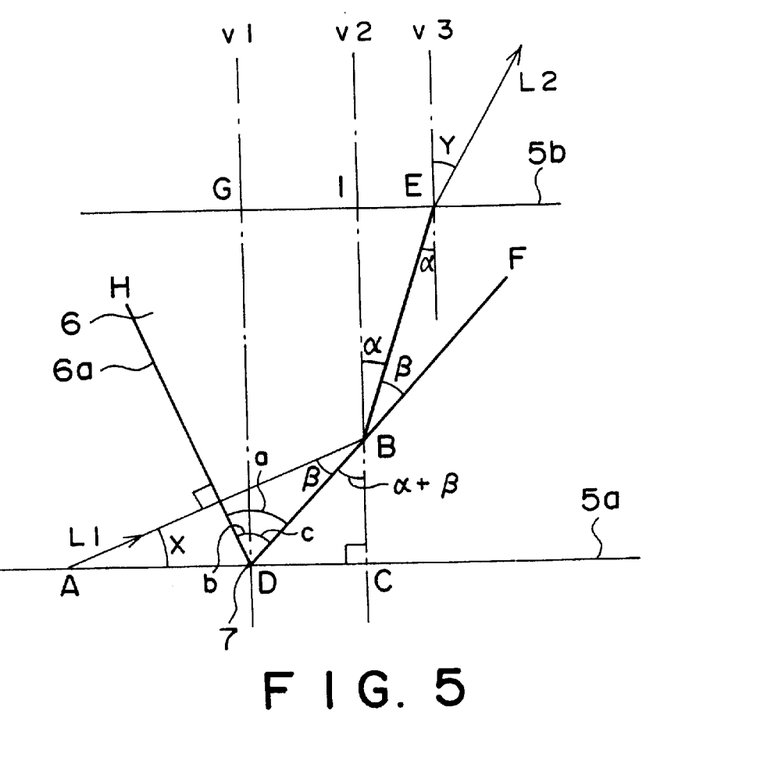
FIG. 5 is a diagrammatic view of assistance in explaining the effects of triangular prisms having a specific shape and included in the lens film of FIG. 4.

The relation between the angles a, b and c defining the shape of the triangular prisms 6, the peak entrance angle X, the exit angle Y and the refractive index n of the lens film 5 will be described with reference to FIG. 5. Referring to FIG. 5, a light ray L1 leaving the light exit surface 1b of the nondiffusive light guide plate 1 at the peak exit angle Z (=peak entrance angle X) falls on the light entrance surface 5a of the lens film 5 at the peak entrance angle X; that is, the light ray L1 falls on the front-side surface 6a (line HD in FIG. 5) of the triangular prism 6 of the lens film 5 perpendicularly to the front-side surface 6a and enters the triangular prism 6. Then, the light rays L1 is reflected at a point B on the back-side surface (line FD in FIG. 5) of the triangular prism 6 in a total reflection mode, and leaves the light exit surface 5b of the lens film 5 at a point E on the light exit surface 5b at the exit angle Y in a deflected light ray L2. The vertical angle a of the triangular prism 6 is divided into the front-side angle b and the back-side angle c by a normal v1 to the light entrance surface 5a at a point D corresponding to the ridge 7 of the triangular prism 6.

Suppose that the normal v1 passes the ridge 7 of the triangular prism 6, a normal v2 passes the point B on the back-side surface (line FD) of the triangular prism 6 at which total reflection of the light ray L1 occurs, and a normal v3 passes the point E on the light exit surface 5b of the lens film 5 at which the deflected light beam L2 leaves the lens film 5. The normal v1 intersects the light exit surface 5b and the light entrance surface 5a at points G and D, respectively. The normal v2 intersects the light exit surface 5b and the light entrance surface 5a at points I and C, respectively, and intersects the back-side surface (line FD) at the point B. The normal v3 intersects the light exit surface 5b at the point E.

The front-side angle b=the peak entrance angle X. Therefore, light loss due to reflection can be reduced to a minimum if the light ray L1 falls on the front-side surface 6a (line HD) of the triangular prism perpendicularly to the front-side surface 6a.

The back-side angle c which enables the deflected light ray L2 to leave the light exit surface 5b of the lens film 5 at the exit angle Y is determined by the following procedure. According to Snell laws of refraction, the relation between the exit angle Y of the deflected light ray L2 leaving the exit surface 5b at the point E and the angle α between the light ray traveling toward the point E and the normal v3 is expressed by:

$$n \times \sin \alpha = 1 \times \sin Y \quad (1)$$

where n is the refractive index of the lens film 5 and therefore, $$\alpha = \sin^{-1}\{(\sin Y)/n\} \quad (2)$$

Since the normal v2 passing the point B on the back-side surface (line FD) of the triangular prism 6 and the normal v3 passing the point E are parallel to each other, ∠IBE=α. Since total reflection occurs at the point B on the back-side surface (line FD), ∠EBF=∠ABD=β. Since ∠CBD and ∠IBF are vertically opposite angles, ∠CBD=∠IBF=α+β. Since the normals v1 and v2 are parallel, ∠GDB (back-side angle c)=∠CBD. Therefore, $$c = \alpha + \beta \quad (3)$$

Since ΔABC is a right-angled triangle with ∠ACB=90°, $$\alpha + 2\beta + X = 90° \quad (4)$$

because ∠CBD=∠ABD=∠BAC=90°. Therefore, from Expression (4), $$\beta = 0.5(90 - \alpha - X) \quad (5)$$

Substituting Expression (5) into Expression (3), $$c = 0.5(90 + \alpha - X) \quad (6)$$

Substituting Expression (2) into Expression (6), Expression (7) is obtained. Since the front-side angle b is equal to the peak entrance angle X, the vertical angle a is expressed by Expression (8).

$$c = 0.5[\sin^{-1}\{(\sin Y)/n\} + 90 - X] \quad (7)$$

$$a = 0.5[\sin^{-1}\{(\sin Y)/n\} + 90 + X] \quad (8)$$

Theoretically, the peak entrance angle X may be an angle in the range of 0 to 90°. Practically, it is preferable that 0°<X≦30°.

Usually, all the triangular prisms 6 of the lens film 5 are formed in the same specific shape, which, however, is not a compulsory condition. For example, if light rays leave from different points on the light exit surface 1b of the nondiffusive light guide plate 1 at different exit angles, respectively, the triangular prisms 6 may be formed in different shapes accordingly to make the deflected light rays leave the exit surface 5b of the lens film 5 at the same exit angle Y. Even if the respective exit angles of light rays leaving the light exit surface 1b of the nondiffusive light guide plate 1 at different positions on the light exit surface 1b differ somewhat from each other, all the triangular prisms 6 of the lens film 5 may be formed in a shape determined on the basis of a representative peak exit angle Z, and the surface light source assembly may employ such a lens film 5.

The lens film 5 provided with the triangular prisms 6 of the specific shape is fabricated by incorporating a prism layer having ridges corresponding to the triangular prisms 6 and made of an ionizing radiation setting resin, such as an acrylate resin, into a base film of a transparent resin, such as a polyethylene terephthalate resin. Concretely, the lens film 5 may be fabricated by a fabricating method proposed by the applicant of the present patent application in JP-A No. 5-169015. The lens film can be fabricated by steps of filling up recesses complementary to the triangular prisms 6 and formed in the circumference of a gravure roller with a liquid ionizing radiation setting resin, winding a base film around the gravure roller, irradiating the ionizing radiation setting resin with ultraviolet rays to harden the liquid ionizing radiation setting resin, and unwinding the base film from the gravure roller. Thus, a lens film provided with triangular prisms of the ionizing radiation setting resin on the base film can be fabricated.

EXAMPLE

A surface light source assembly in Example of the present invention will be concretely described hereinafter in comparison with comparative examples.

Nondiffusive Light Guide Plate

A 220 mm wide nondiffusive light guide plate 1 in an example has a rectangular light exit surface 1b of 220 mm by 168 mm. The thickness of the large end surface on the side of the light source 2, i.e., the width of the light entrance surface 1a, of the nondiffusive light guide plate 1 is 3 mm and the thickness of the small end surface remote from the side of the light source 2 is 0.478 mm. The nondiffusive light guide plate 1 has a flat light exit surface 1b, and a quadratic back surface 1c delineated by a concave, approximate parabolic curve, and curved so that the thickness of the light guide plate 1 decreases with distance from the light entrance surface 1a. Thus, the nondiffusive light guide plate 1 has a wedge-shaped section having one concavely curved side 1d having the shape of a concave parabolic curve. The nondiffusive light guide plate 1 was formed by an ordinary injection molding process using a transparent acrylic resin (DELPET 80NH, available from Asahi Kasei Kogyo K.K.).

As shown in FIG. 1, the concavely curved side 1d is represented by a quadratic equation:

$$y = 14.9845(x - 3.5)^{2.2} - 2.76$$

expressing an approximate parabolic curve, in which positive values for y are measured to the right, as viewed in FIG. 1B, on the y-axis perpendicular to the light entrance surface 1a, and positive values for x are measured downward, as viewed in FIG. 1B, on the x-axis parallel to the light entrance surface 1a. The peak exit angle Z, i.e., an angle to the light exit surface 1b of the nondiffusive light guide plate 1 at which most light rays leave the light exit surface 1b of the nondiffusive light guide plate 1 was 8°. The half width angle of the exit angle distribution was 10°.

Lens Film

The shape of triangular prisms 6 included in a lens film 5 was designed so that light rays leaving the light exit surface 1b of the nondiffusive light guide plate 1 at the peak exit angle Z of 8° fall on the light entrance surface 5a of the lens film 5 at a peak entrance angle X of 8°, travel through the lens film 5 and leave the light exit surface 5b of the lens film in a direction parallel to a normal to the light exit surface 5b of the lens film 5.

The vertical angle a of the triangular prisms calculated by substituting X=8°, Y=0° and n=1.57 into Expression (8) was 49°, Since ∠b=∠X=8°, ∠c=∠a−∠b =49°−8°=41°. The lens film 5 was made so as to meet those conditions (FIG. 4).

A transparent base film was formed by forming a 2 μm thick undercoating layer on a 125 μm thick polyethylene terephthalate film (A-4300, available from Toyo-bo K.K.) by coating a surface of the polyethylene terephthalate film with a coating liquid prepared by mixing 100 parts by weight of a medium for a chemical mat (available from The Inktec Co.) and 10 parts by weight of an isocyanate hardening agent (XEL Hardener, available from The Inktec Co.).

Then, triangular prisms 6 of an ultraviolet-setting resin (Z-9002A, available from Nippon Gosei Gomu K.K.) were formed on the base film by the above-mentioned method disclosed in JP-A No. 5-169015 to complete the lens film 5. The triangular prisms 6 are about 40 μm in height and about 50 μm in the width of the base. The refractive index n of the lens film 5 was 1.57.

Surface Light Source Assembly

A cold cathode tube as the linear light source 2 was disposed beside the light entrance surface 1a of the nondiffusive light guide plate 1, a white polyethylene terephthalate film as the reflecting member 3 was disposed near the back surface 1b of the nondiffusive light guide plate 1, an then the lens film 5 was disposed near the light exit surface 1b of the nondiffusive light guide plate 1 with the triangular prisms 6 facing the nondiffusive light guide plate 1 and with the front-side surfaces 6a of the triangular prisms 6 directed toward the side of the cold cathode tube to construct a surface light source assembly provided with the nondiffusive light guide plate 1 of the present invention as shown in FIGS. 1A and 1B.

Comparative Example 1

A surface light source assembly in Comparative example 1 was fabricated by a method similar to that by which the surface light source assembly in Example of the present invention was fabricated. The surface light source assembly in Comparative example 1 differs from the surface light source assembly in Example of the present invention only in that a nondiffusive light guide plate employed in Comparative example 1 has a flat light exit surface, a flat back surface, a wedge-shaped section delineated by straight lines, and variable thickness linearly decreasing with distance from its thick end toward its thin end. The surface light source assembly in Comparative example 1 is the same in other respects as the surface light source assembly in Example of the present invention. The peak exit angle Z of the nondiffusive light guide plate employed in Comparative example 1 was 8°.

Comparative Example 2

A light guide plate employed in Comparative example 2 was provided with a diffusive reflecting layer formed by screen-printing minute white dots on a back surface of a nondiffusive light guide plate similar to that employed in Comparative example 1. The reflecting film employed in Example was disposed near the back surface of the light guide plate. A diffusive film (D-115, available from Kimoto K.K.) and two lens films (BEF, available from Sumitomo Suri Emu K.K.) were disposed in that order near the light exit surface of the light guide plate to construct a surface light source assembly in Comparative example 2.

Performance Evaluation

The performance of the surface light source assemblies in Example and Comparative examples 1 and 2 was evaluated.

(1) Uniformity in surface luminance distribution

Figure 6:
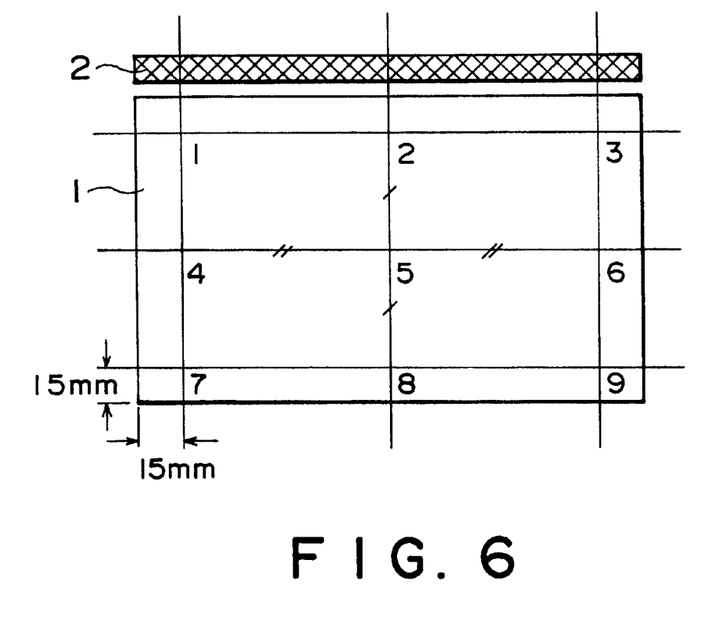
FIG. 6 is a plan view of the surface light source assembly, showing luminance measuring points.
Figure 7:
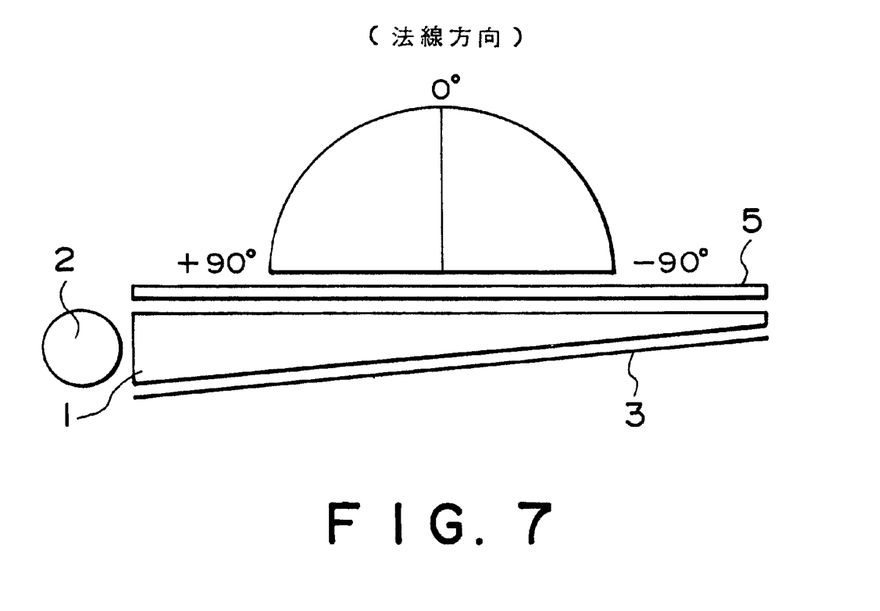
FIG. 7 is a schematic view of the surface light source assembly, showing angular luminance distribution measuring directions.

Luminance at nine measuring points shown in FIG. 6 on the light exit surface of each surface light source assembly, i.e., the light exit surface of the lens film, was measured from a direction parallel to a normal to the light exit surface by a luminance measuring apparatus (BM-8, available from Topukon K.K.). As is obvious from FIG. 6, the measuring point 5 is at the center of the light exit surface, and the other eight measuring points are on segment lines extending in parallel to and at a distance of 15 mm from the sides of the light exit surface. Measured values are tabulated in Table 1, in which surface luminance uniformity is expressed by the ratio in percentage of a minimum measured value to a maximum measured value (MIN/MAX).

(2) Directional luminance distribution

Figure 8:
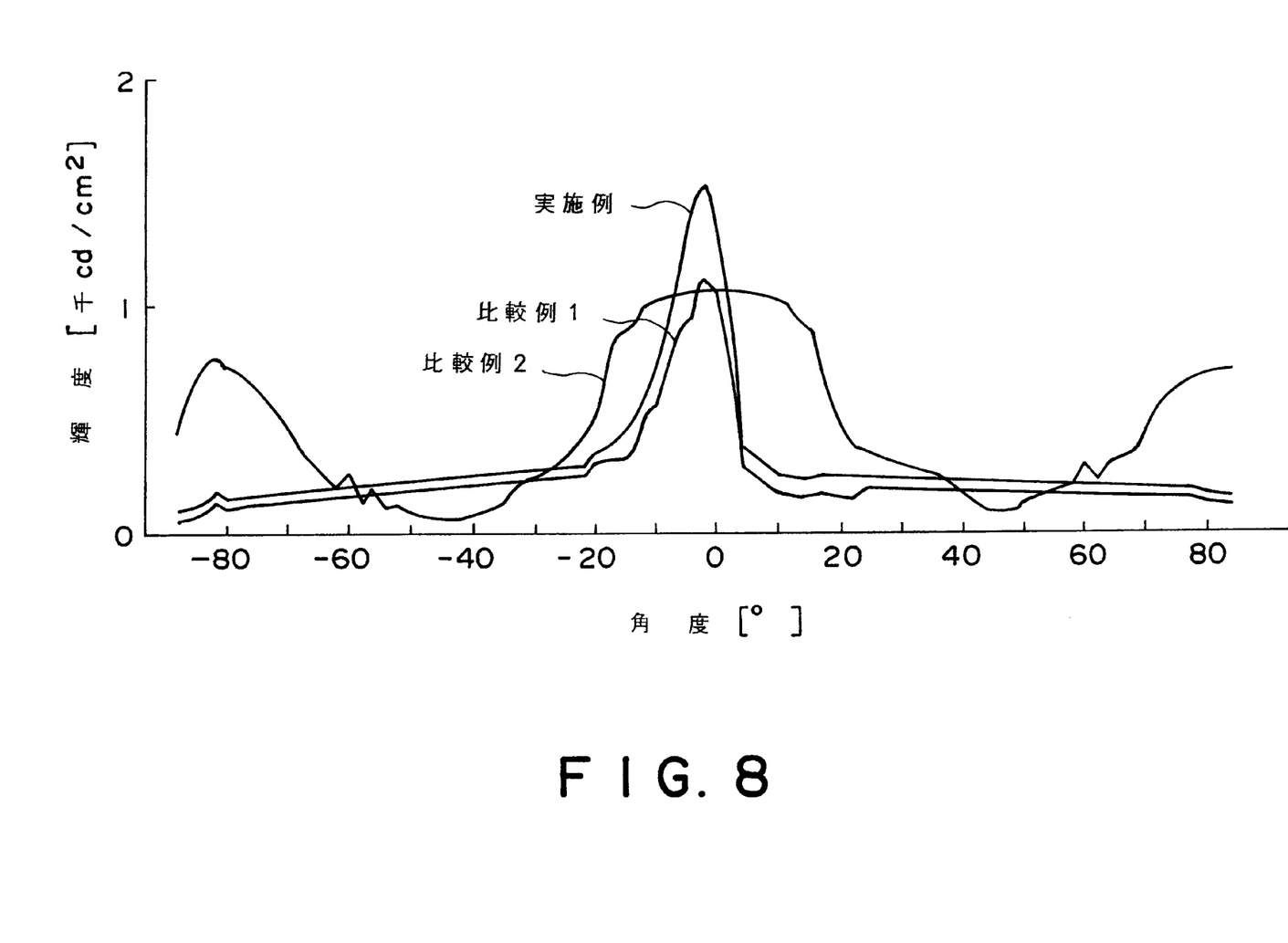
FIG. 8 is a graph comparatively showing a measured angular luminance distribution on a surface light source assembly in an example of the present invention and those on surface light source assemblies in comparative examples.

Luminance at the measuring point 5 was measured from different directions defined by angles to a normal at the measuring point 5 to the light exit surface of the lens film in a plane perpendicular to both the side near the surface source 2 of the lens film 5 and the light exit surface of the lens film 5. Results of measurement are shown in FIG. 8.

TABLE 1

Surface luminance distribution

| | Luminance with respect to normal (cd/m²) | | |
|---|---|---|---|
| Measuring point | Example | Comp. Ex. 1 | Comp. Ex. 2 |
| 1 | 1250 | 880 | 890 |
| 2 | 1220 | 910 | 960 |
| 3 | 1310 | 850 | 1030 |
| | 1430 | 1010 | 1120 |
| 5 | 1510 | 1090 | 1050 |
| 6 | 1420 | 1000 | 1010 |
| 7 | 1370 | 1120 | 950 |
| 8 | 1460 | 1250 | 1070 |
| 9 | 1400 | 1180 | 1000 |
| Mean | 1374 | 1026 | 1009 |
| MIN/MAX (%) | 81 | 66 | 80 |

Note:
MIN: Minimum luminance,
MAX: Maximum luminance

As is apparent from Table 1, luminances at measuring points 1, 2 and 3, i.e., points near the side on the side of the light source, of the Comparative example 1 are low, and the uniformity of the surface luminance distribution represented by the MIN/MAX ratio of 81% on the light exit surface of Example is higher than that represented by the MIN/MAX ratio of 66% on the light exit surface of Comparative example 1 and compares favorably with the MIN/MAX ratio of 80% on the light exit surface of Comparative example 2.

As is obvious from FIG. 8, each of the directional luminance distribution curves for the surface light source assemblies in Example and Comparative example 1 has a steep peak only around an angle of a direction parallel to the normal, which proves that the surface light source assembly is suitable for uses in which the surface light source assembly is observed from a direction parallel to a normal to its light exit surface and that the surface light source assembly emits light at a low loss in the quantity of light. The directional luminance distribution curve for the surface light source assembly in Comparative example 2 has wide distributions of high values about angles of 0°, −80° and +80°, which proves that light rays are wastefully emitted in directions nearly parallel to the light exit surface and that the surface light source assembly emits light at a high loss in the quantity of light.

Although the invention has been described in its preferred form with a certain degree of particularity, obviously many changes and variations are possible therein. It is therefore to be understood that the present invention may be practiced otherwise than as specifically described herein without departing from the scope and spirit thereof.

What is claimed is:

1. A nondiffusive light guide plate which receives light rays falling thereon and emits the light two-dimensionally, said nondiffusive light guide plate comprising:
    a side light entrance surface;
    a nondiffusive flat light exit surface through which light rays received through the side light entrance surface leaves; and
    a concavely curved back surface extended opposite to the nondiffusive light exit surface, having a section in a plane perpendicular to both the side light entrance surface and the nondiffusive light exit surface, delineated by a concave curve, and curved so that the space between the light exit surface and the back surface, and the gradient thereof decrease with distance measured in the direction of travel of received light rays from the side light entrance surface.

2. The nondiffusive light guide plate according to claim 1, wherein the concave curve is a portion of an approximate parabolic curve.

3. The nondiffusive light guide plate according to claim 1, wherein the concave curve is a portion of a parabolic curve.

4. The nondiffusive light guide plate according to claim 1, wherein the light entrance surface and the light exit surface are rectangular, and the light entrance surface and the light exit surface intersect perpendicularly each other.

5. The nondiffusive light guide plate according to claim 1, wherein all the concave curves delineating the sections in parallel planes perpendicular to both the side light entrance surface and the nondiffusive light exit surface of the back surface are the same.

6. A lens film for refracting incident light rays, having a light entrance surface provided with a plurality of triangular prisms in a two-dimensional arrangement, and a flat light exit surface extended opposite to the light entrance surface;
    wherein each of the plurality of triangular prisms have a vertical angle a expressed by:

$$a=0.5[\sin^{-1}\{(\sin Y)/n\}+90+X]$$

where Y is a predetermined exit angle to a normal to the light exit surface of the light exit surface of the lens film, specifying a direction in which light rays leaving the light exit surface travel, X is a predetermined entrance angle to the light entrance surface of the lens film, specifying a direction in which light rays fall on the light entrance surface of the lens film, and n is the refractive index of the lens film, and
    the vertical angle a of each triangular prism is divided by a normal to the light entrance surface at the vertex of the triangular prism into a front-side angle b expressed by:

$$b=X$$

and a back-side angle c expressed by:

$$c=0.5[\sin^{-1}\{(\sin Y)/n\}+90-X].$$

7. The lens film according to claim 6, wherein the lens film is disposed near a light guide plate so that light rays leaving the light exit surface of the light guide plate fall on a light entrance surface thereof, and
    the predetermined entrance angle X is equal to a peak exit angle defining a direction in which most of light rays leaving the light exit surface of the light guide plate travel in a predetermined direction distribution.

8. The lens film according to claim 6, wherein incident light rays falling on the light entrance surface of the lens film at the predetermined entrance angle X fall on a light entrance surface of each of the triangular prisms perpendicularly to the same.

9. The lens film according to claim 6, wherein incident light rays falling on the light entrance surface of the lens film at the predetermined entrance angle X fall on a light entrance surface of each of the triangular prisms, are reflected by a reflecting surface of the triangular prism, adjacent to the light entrance surface, and leave the lens film through the light exit surface of the lens film.

10. A surface light source assembly comprising:
    a nondiffusive light guide plate having a side light entrance surface, a light exit surface perpendicularly intersecting the side light entrance surface and a back surface extended opposite to the light exit surface, capable of transmitting incident light rays falling on the side light entrance surface and emitting light rays from the two-dimensional light exit surface;
    a light source disposed near the side light entrance surface of the nondiffusive light guide plate; and
    a reflecting member disposed near the back surface of the nondiffusive light guide plate;
    wherein the nondiffusive light guide plate comprises:
        a side light entrance surface;
        a nondiffusive flat light exit surface through which light rays received through the side light entrance surface leaves; and
        a concavely curved back surface extended opposite to the nondiffusive light exit surface, having a section in a plane perpendicular to both the side light entrance surface and the nondiffusive light exit surface, delineated by a concave curve, and curved so that the space between the light exit surface and the back surface, and the gradient thereof decrease with distance measured in the direction of travel of received light rays from the side light entrance surface;
    the lens film for refracting incident light rays, has a light entrance surface provided with a plurality of triangular prisms in a two-dimensional arrangement, and a flat light exit surface extended opposite to the light entrance surface, each of the plurality of triangular prisms having a vertical angle a expressed by:

$$a=0.5[\sin^{-1}\{(\sin Y)/n\}+90+X]$$

where Y is a predetermined exit angle to a normal to the light exit surface of the light exit surface of the lens film, specifying a direction in which light rays leaving the light exit surface travel, X is a predetermined entrance angle to the light entrance surface of the lens film, specifying a direction in which light rays fall on the light entrance surface of the lens film, and n is the refractive index of the lens film, and the vertical angle a of each triangular prism being divided by a normal to the light entrance surface at the vertex of the triangular prism into a front-side angle b expressed by:

$$b=X$$

and a back-side angle c expressed by:

$$c=0.5[\sin^{-1}\{(\sin Y)/n\}+90-X].$$

11. The surface light source assembly according to claim 10, wherein the light source is a linear light source disposed in parallel to the side light entrance surface of the nondiffusive light guide plate.

12. The surface light source assembly according to claim 10, wherein the concave curve is a portion of an approximate parabolic curve.

13. The surface light source assembly according to claim 10, wherein the concave curve is a portion of a parabolic curve.

14. The surface light source assembly according to claim 10, wherein the light entrance surface and the light exit surface are rectangular, and the light entrance surface and the light exit surface intersect perpendicularly each other.

15. The surface light source assembly according to claim 10, wherein all the concave curves delineating the sections in parallel planes perpendicular to both the side light entrance surface and the nondiffusive light exit surface of the back surface are the same.

16. The surface light source assembly according to claim 10, wherein the lens film is disposed near the nondiffusive light guide plate so that light rays leaving the light exit surface of the nondiffusive light guide plate fall on a light entrance surface thereof, and the predetermined entrance angle X is equal to a peak exit angle defining a direction in which most of light rays leaving the light exit surface of the light guide plate travel in a predetermined direction distribution.

17. The surface light source assembly according to claim 10, wherein incident light rays falling on the light entrance surface of the lens film at the predetermined entrance angle X fall on a light entrance surface of each of the triangular prisms perpendicularly to the same.

18. The surface light source assembly according to claim 10, wherein incident light rays falling on the light entrance surface of the lens film at the predetermined entrance angle X fall on a light entrance surface of each of the triangular prisms, are reflected by a reflecting surface of the triangular prism, adjacent to the light entrance surface, and leave the lens film through the light exit surface of the lens film.

* * * * *